United States Patent [19]

Casanova Valero

[11] 4,121,511

[45] Oct. 24, 1978

[54] AUTOMATIC MACHINE FOR CUTTING AND PITTING FRUIT, ESPECIALLY PEACHES

[75] Inventor: Jose Maria Casanova Valero, Murcia, Spain

[73] Assignee: Chaconsa. Compania Hispanoamericana de Construcciones Conserveras S.A., Murcia, Spain

[21] Appl. No.: 654,874

[22] Filed: Feb. 3, 1976

[30] Foreign Application Priority Data

Feb. 11, 1975 [ES] Spain ............................... 209874[U]
Feb. 11, 1975 [ES] Spain ............................... 209876[U]
Sep. 25, 1975 [ES] Spain ............................... 215445[U]

[51] Int. Cl.² .......................... A23N 4/04; B65G 15/00
[52] U.S. Cl. ........................................ 99/550; 99/563; 198/384
[58] Field of Search ................ 99/547, 549, 550, 552, 99/553, 562, 563, 564; 198/384–385; 214/311

[56] References Cited

U.S. PATENT DOCUMENTS

| | | | |
|---|---|---|---|
| 1,407,524 | 2/1922 | Fourchy | 99/563 |
| 2,588,790 | 3/1952 | Altman | 99/550 |
| 2,735,465 | 2/1956 | Kellogg | 99/550 |
| 2,946,361 | 7/1960 | Skog | 99/550 |
| 3,167,169 | 1/1965 | Halles | 198/384 |
| 3,602,281 | 8/1971 | Anderson | 99/550 |

*Primary Examiner*—Harvey C. Hornsby
*Assistant Examiner*—Robert Pous
*Attorney, Agent, or Firm*—Wenderoth, Lind & Ponack

[57] ABSTRACT

An automatic machine for cutting and pitting fruit, especially peaches, includes three fundamental parts or working zones, the first of which is a feeding device for feeding the fruit to the second zone which includes an automatic positioning device in the form of an endless conveyor carrying a plurality of cups or receptacles to receive the fruit from the feeding device. The third and final zone of the machine is an automatic cutting and pitting device having a fruit gripping assembly, a circular knife which divides the fruit into two parts, and a knife for pitting the fruit. The fruit feeding device includes a hopper to which, by any suitable system or means, the fruit is supplied, the hopper being mounted on the frame of the machine at an angle. The hopper is supported by a flexible damper and is subjected to the action of a conventional vibrator. The hopper has at the outlet thereof as many channels as there are cups or receptacles in a column of the automatic positioning device. The channels conduct the fruit to other more steeply inclined channels, each of which leads to an upwardly extending ramp, the upper edge of which forms an outlet for the fruit to be supplied onto the cups or receptacles of the positioning device. The fruit feeding device has, at the inlet thereof, other longitudinal channels above which are arranged circular brushes which rotate in a direction opposite to the direction of advancement of the fruit.

6 Claims, 12 Drawing Figures

AUTOMATIC MACHINE FOR CUTTING AND PITTING FRUIT, ESPECIALLY PEACHES

BACKGROUND AND SUMMARY OF THE INVENTION

The present invention relates to an automatic machine for cutting and pitting fruit, especially peaches, and which includes three fundamental parts or working zones, i.e. (a) a feeding device or zone, (b) an automatic positioning device or zone, and (c) an automatic cutting and pitting device or zone.

The fruit feeding device includes a hopper to which the fruit, conveniently measured, is fed by means such as a suitable lifting element or the like. The hopper is supported on the general frame of the machine by means of flexible dampers and is subjected to the action of a conventional vibrator. The hopper has, at the outlet thereof, as many channels as there are cups or receptacles in each column of the positioning device.

Each one of the channels aligns and supplies the fruit by gravity to other slightly more inclined channels, each of which leads to an upwardly inclined ramp the upper edge of which forms an outlet for the fruit, from which the fruit falls onto one of the cups or receptacles of the positioning device.

This movement of the fruit upwardly along the ramps is achieved by thrust exerted on the fruit by rods activated by a pneumatic piston or by a mechanically operated cam.

The positioning device, which is fed by the mentioned feeding device to convey the fruit to the cutting and pitting zone, is an endless conveyor having means to align the fruit so that the fruit reaches the cutting zone in the suitable position.

The conveyor has a plurality of cups or receptacles for the fruit and is subjected to vibration, so that each of the mentioned cups or receptacles vibrates integrally therewith, thus imparting to the fruit a tendency to rotate or turn.

Each of the cups or receptacles have, at the center of the bottom thereof, a protruding and rounded pivot from which extend in opposite radial directions two flat wings, the purpose of which is to brake further turning of the fruit, in spite of the vibration, when the fruit has reached a position such that the pivot and the wings extend into the cleft of the fruit, specifically the peach, at which the fruit has been joined to the peduncle.

The device to cut and pit the fruit supplied by the positioning device includes a gripping assembly for gripping the fruit from the positioning device and moving the gripped fruit through a circular knife which divides the fruit into two equal parts, and then moving the cut fruit halves through a separator including a pitting knife.

The circular knife cuts the fruit, including the pit, into two parts. The separator has a central plane which is coplanar with the circular knife. The separator has an initial thickness is smaller than that of the circular knife and ends with a thickness which permits housing therein of the single pitting knife.

BRIEF DESCRIPTION OF THE DRAWINGS

To facilitate further understanding of the structural and functional characteristics of the machine of the invention, reference is made to the attached drawings, wherein.

DETAILED DESCRIPTION OF THE INVENTION

Figure 1:
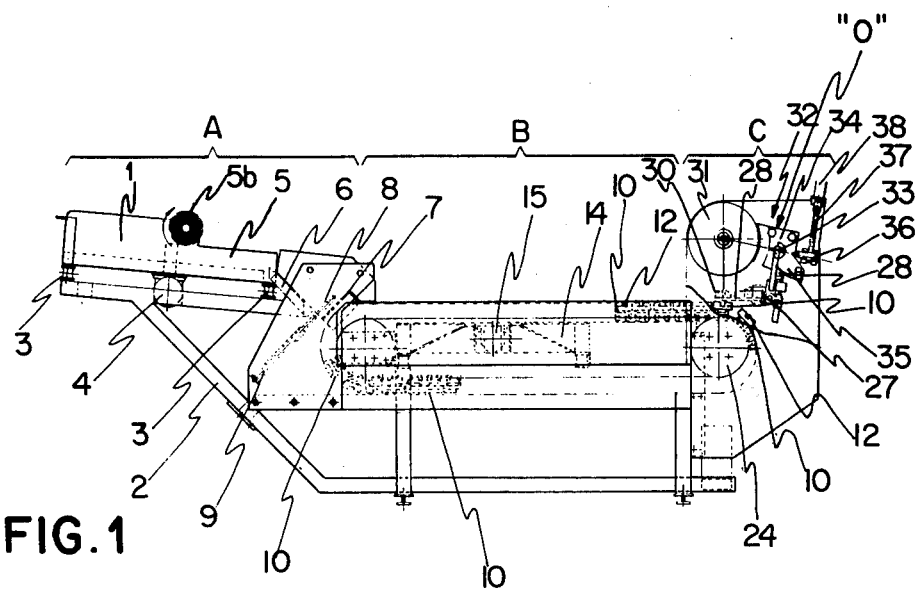
FIG. 1 is a longitudinal elevation view of the machine of the present invention.

The automatic machine for cutting and pitting fruit, especially peaches, to which the present invention refers, comprises three fundamental parts of working zones, namely (a) a feeding device or zone A, (b) a positioning device or zone B, and (c) a cutting and pitting device or zone C.

In zone A, the fruit feeding device includes a hopper 1 mounted at an inclination on the frame 2 by means of flexible dampers 3. Hopper 1 is vibrated by the action of a conventional vibrator 4 coupled to hopper 1.

The outlet zone of hopper 1 includes a plurality of channels 5 each one of which leads to a corresponding further channel 6 arranged at a greater degree of inclination than channels 5.

Hopper 1 includes longitudinal channels 5a above which are arranged circular brushes 5b, the height of which are adjustable, to aid in aligning the fruit in the channels. Brushes 5b are power actuated and turn in a direction opposite to the direction of advancement of the fruit, to act as a brake on the fruit as they initiate their movement into channels 5 of the hopper.

Channels 5a, 5 and 6 form canals which extend generally parallel and independent from each other from the hopper 1 to ramps 7 which are inclined upwardly toward the second zone or intermediate zone B of the machine.

For each generally right angle formed by the channels 6 and respective ramps 7, there is provided a rod 8 which is activated by a respective pneumatic piston 9. Activation of pistons 9 (or by other actuators such as mechanically operated cams) causes movement of the rods 8 through the channels 6 in a direction parallel to adjacent ramps 7, or alternatively, withdrawal of rods 8 from channels 6 to positions immediately below the surfaces of channels 6.

Adjacent to feeding device or zone A, the machine is provided with the positioning device which includes an endless conveyor to conduct the fruit from zone A, wherein the fruit is supplied by the feeding device, to zone C, wherein the fruit is cut and pitted, and to which zone C the fruit should be supplied in a properly aligned position.

Figure 9:
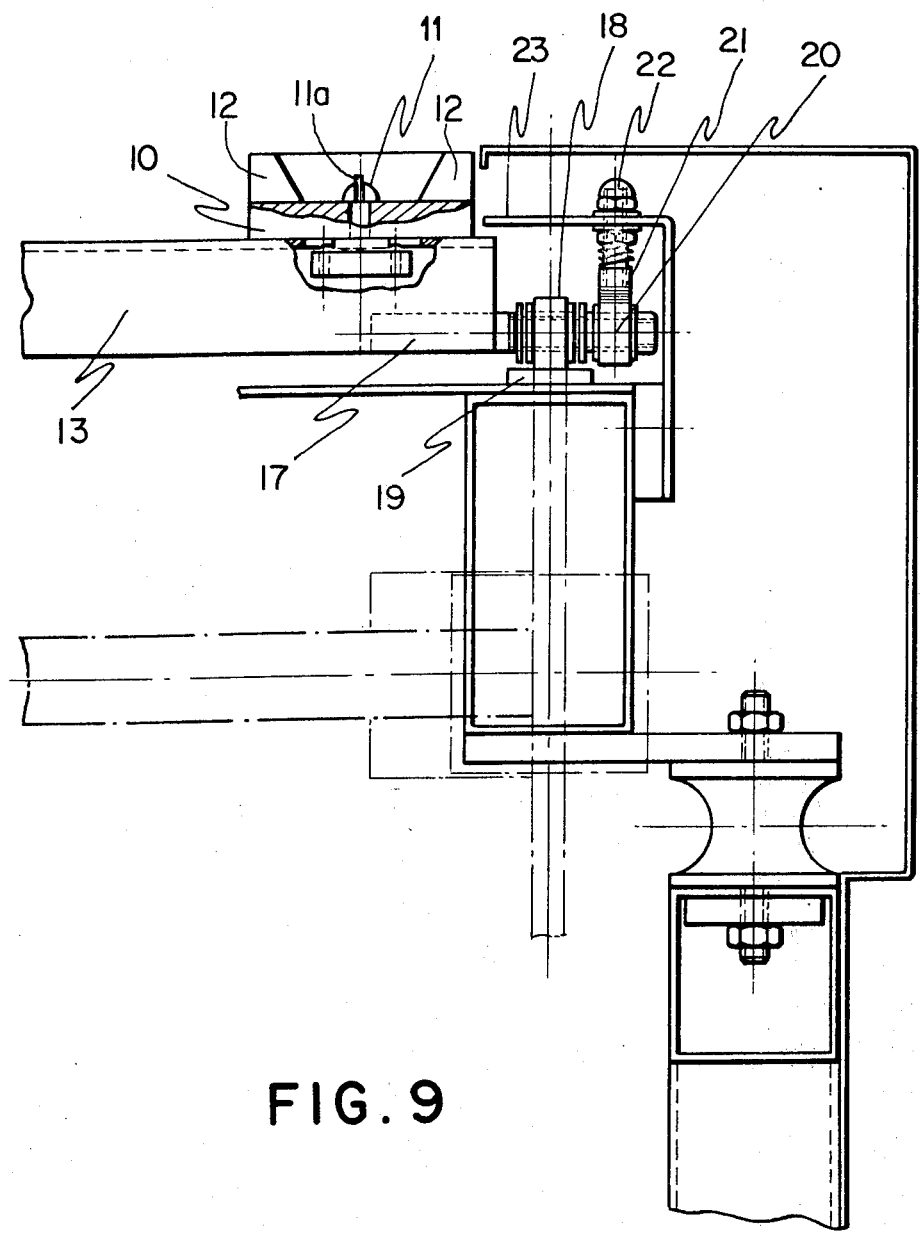
FIG. 9 is an enlarged view, partially in section, of a detail of a guide of the conveyor of the machine of the invention.

To achieve such end, the conveyor of zone B of the machine has a plurality of cups or receptacles 10, the inner shape of which is a truncated cone, as particularly seen in FIG. 9, which receive the fruit from zone A and transport it to zone C in the following manner.

The cups 10 are each provided with an inner wedge including a central pivot 11 and two wings or projections 11a extending radially outwardly from pivot 11 and in the direction of advancement of the conveyor. Projections 11a generally adapt to the shape of the characteristic cleft at the end of the fruit at the joining point thereof with the peduncle, and which, as is known, coincides with and extends in the larger sectioned plane of the pit of the fruit. Orthogonally to wings or projections 11a, the cups 10 each have a groove 12 the purpose of which will subsequently become apparent.

Figure 7:
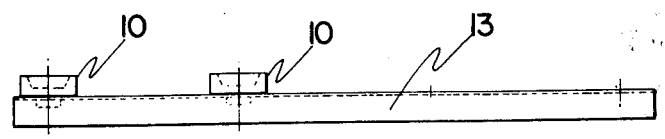
FIG. 7 is a front elevational view of one of the cup or receptacle holders forming part of the conveyor of the machine of the invention.
Figure 8:
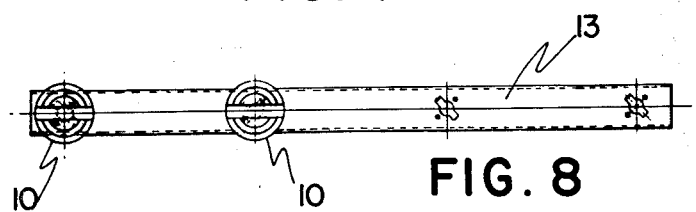
FIG. 8 is an upper plan view of the element of FIG. 7.

Cups 10, as shown in FIGS. 7 and 8, are fixed by means of a rapid mounting and dismounting system to the beams 13 which transmit vibration to the fruit in the cups.

Figure 2:
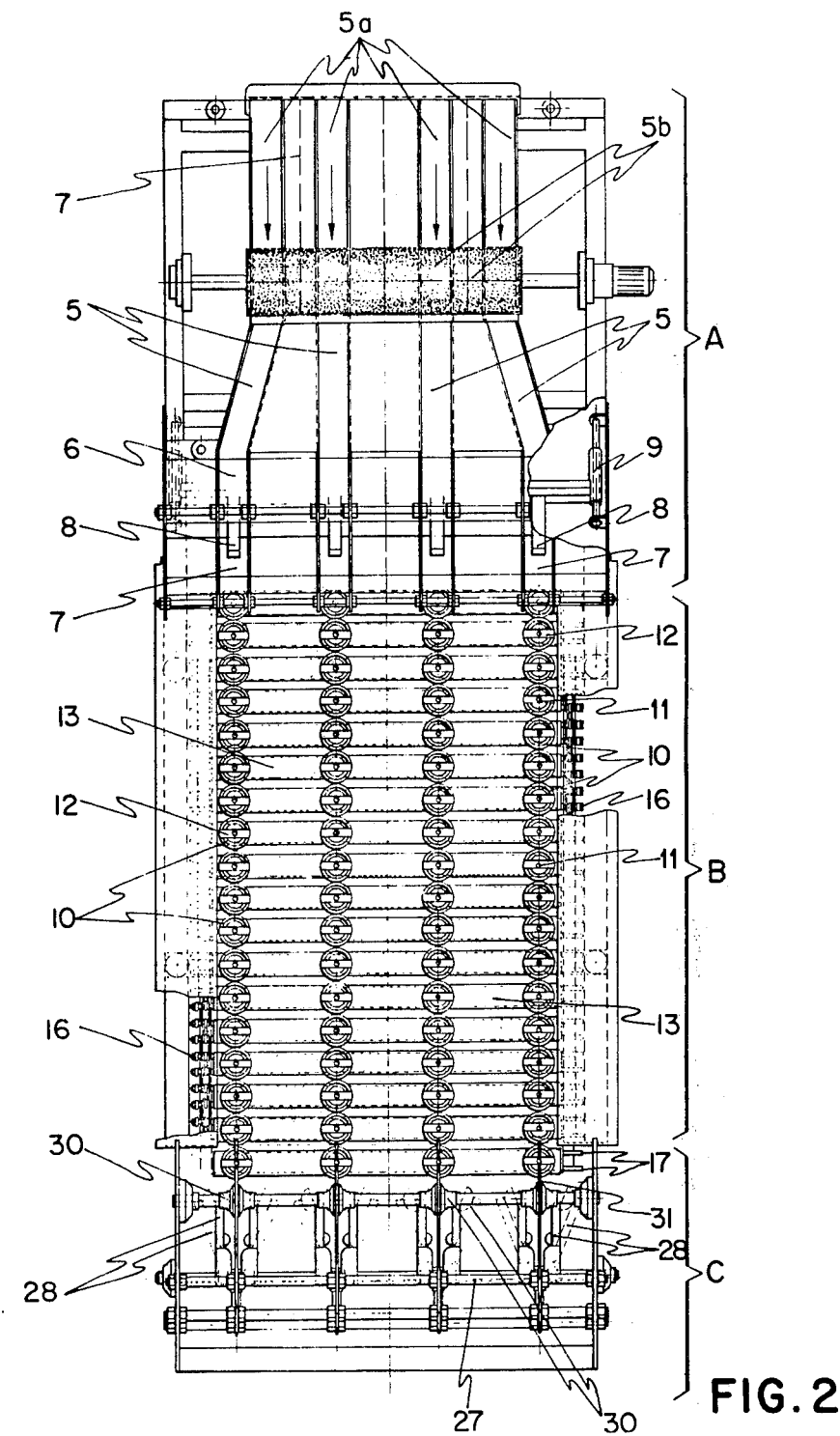
FIG. 2 is an upper plan view of the machine of FIG. 1.
Figure 3:
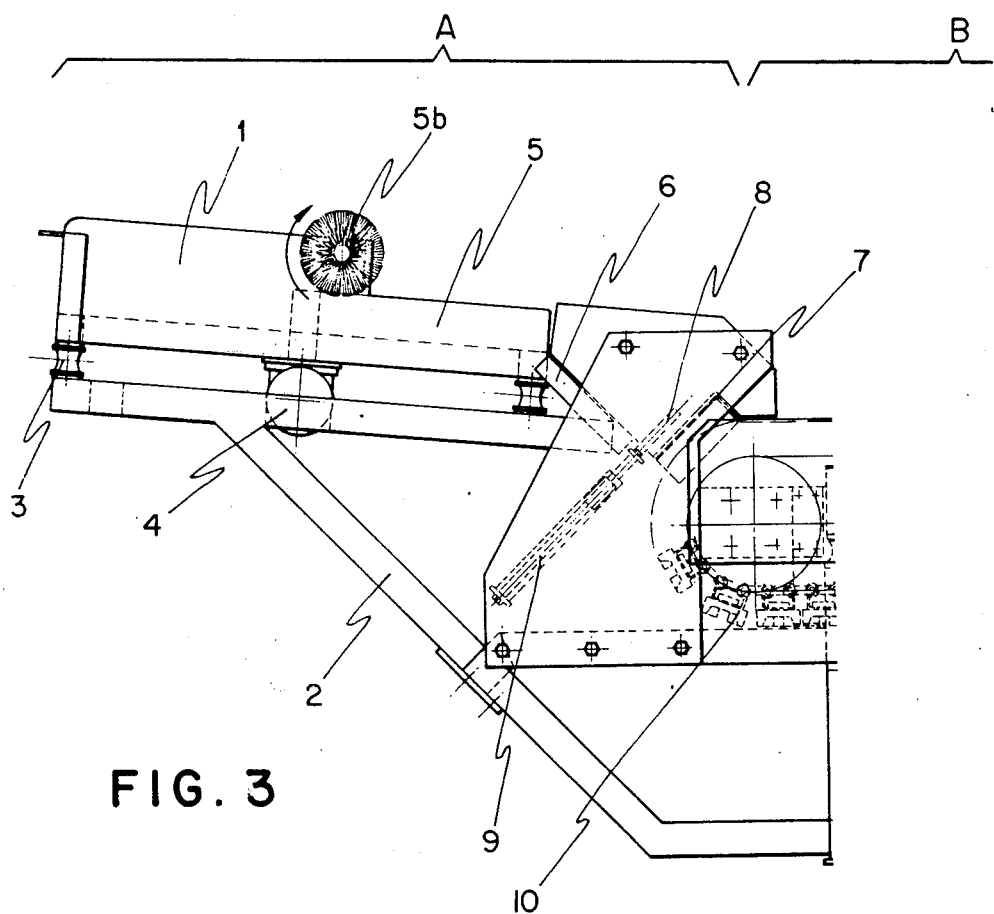
FIG. 3 is a side elevational view, on an enlarged scale, of the feeding or aligning and measuring device which forms the first working zone of the machine of the invention.
Figure 4:
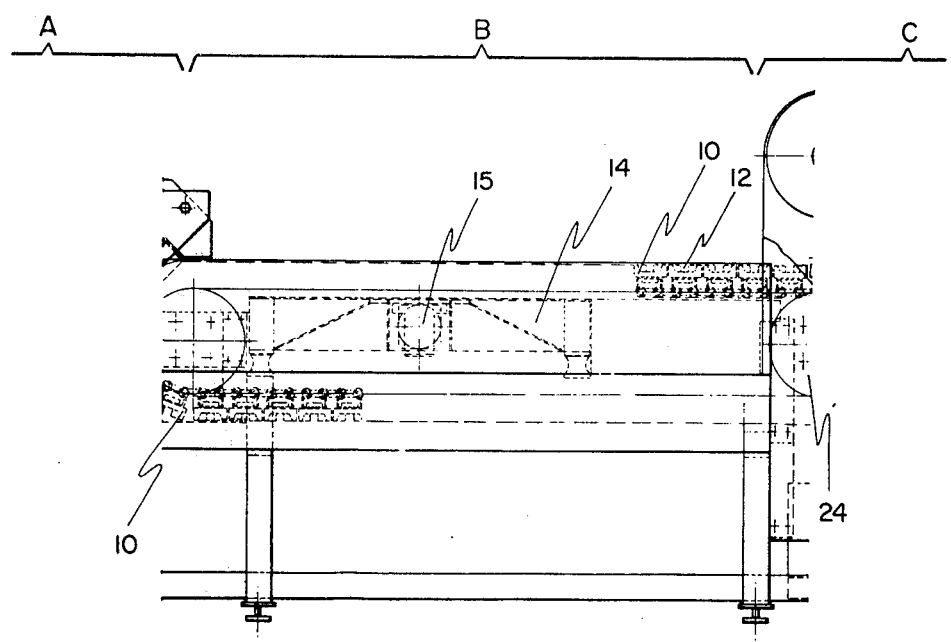
FIG. 4 is a side elevational view, on an enlarged scale, of the positioning device which forms the second working zone of the machine of the invention.

A vibrating table 14 is designed in such a way that by means of a vibrator 15 a uniform vibration is obtained on the complete surface of table 14, and particularly on the two sides thereof on which travel the lateral chains 16 of the conveyor which transport the beams 13 which support the cups 10. As shown in FIGS. 2 and 9, pins 17 extend from beams 13 into the interior of the small wheels 18 of the chain 16.

Small wheels 18, which are solidly fixed to the links of the chain 16, rest on tracks 19 which are fixed to the vibrating table 14.

Exterior to the small wheel 18 of the chain 16, the pins 17 of the beams 13 support another free small wheel 20 on the upper end of which rests a pressure pad 21, the thrust of which is adjustable by means of screw-bolt nut assembly 22. The pad 21, the screws and the bolt nuts are solidly fixed to side member 23 which is fixed to the side of the vibrating table 14.

In this way pad 21, which is solidly fastened to the table 14, pushes the supporting beam 13 against table 14 via small wheel 20, even though beam 13 has freedom of movement in the longitudinal direction of the conveyor by means of small wheels 18 rolling over track 19.

By means of this assembly, vibration of the static table 14 is efficiently transmitted to the supporting beams 13 which are displaced along the tracks 19 by means of wheels 18. The beams 13 in turn transmit the vibration to the cups 10 joined thereto, thereby vibrating and rotating the fruit until it is conveniently positioned with wings 11a aligned in the respective clefts of the fruit.

As can particularly be seen in FIG. 1, an area of the conveying zone downstream of the vibrating table 14, as viewed in the direction of advancement, may be used to permit a subsequent manual or visual inspection of the positioning of the fruit before it reaches cutting zone C.

Cutting and pitting zone C includes a device which is placed at the end of the path of the endless conveyor of zone B in such a way that the device first acts on the fruit at a position substantially aligned vertically above the centers of the two driving pinions 24 which are positioned at the end of the endless conveyor of zone B.

Figure 6:
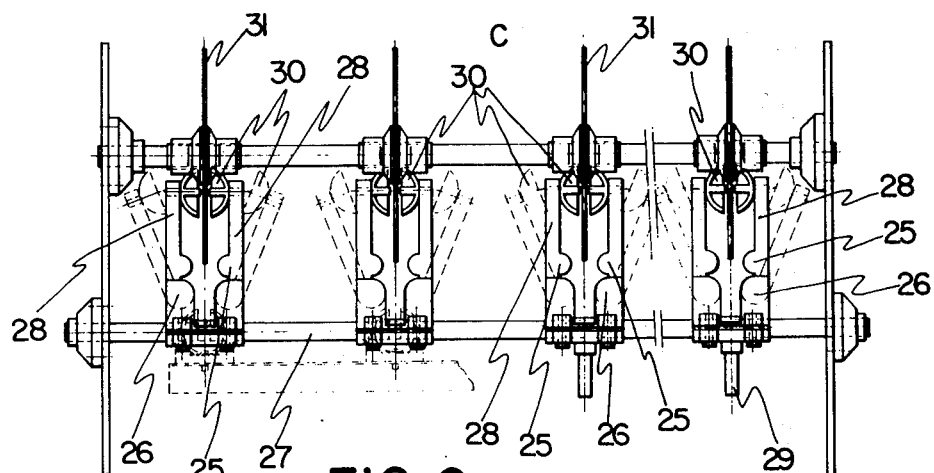
FIG. 6 is a front elevational view of the cutting device.
Figure 10:
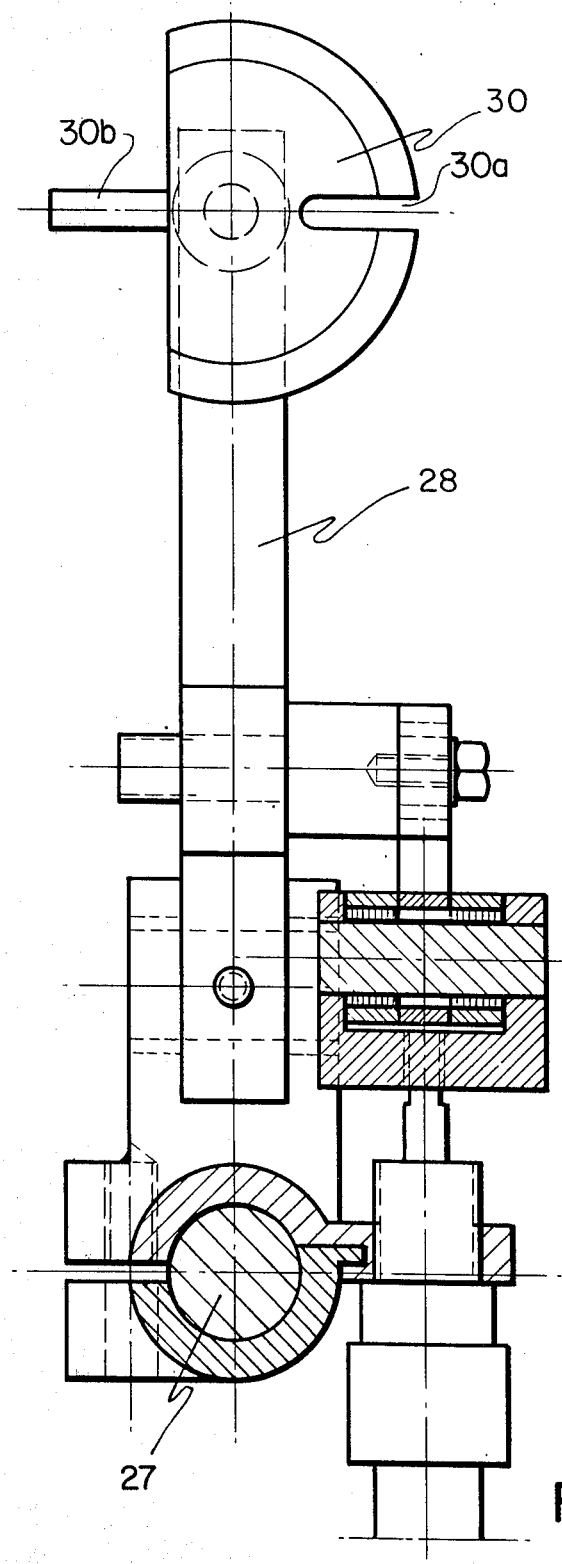
FIG. 10 is an enlarged view, partially in section, of a fruit holding device of the machine of the invention.

The device includes, for each row of cups 10, a pair of movable and articulated fastening clips 25, each one of which is supported by a clip body 26 which is fixed to a rotatable axle 27. Each clip 25 supports an arm 28 at the free end of which is attached a grasping cup 30. A piston 29 is activated to move paired arms 28 and grasping cups 30 toward and away from each other, as shown particularly in FIG. 6. As shown in FIGS. 6 and 10, each cup 30 has at the upper part thereof a groove 30a and at the lower part thereof a downwardly curved wedge 30b, the latter element, when the paired cups 30 are moved toward each other, passing through groove 12 of the particular cup 10 which has fed the fruit from zone B. The paired cups 30 thus grasp the fruit which has been supplied and aligned by the respective cup 10.

Figure 5:
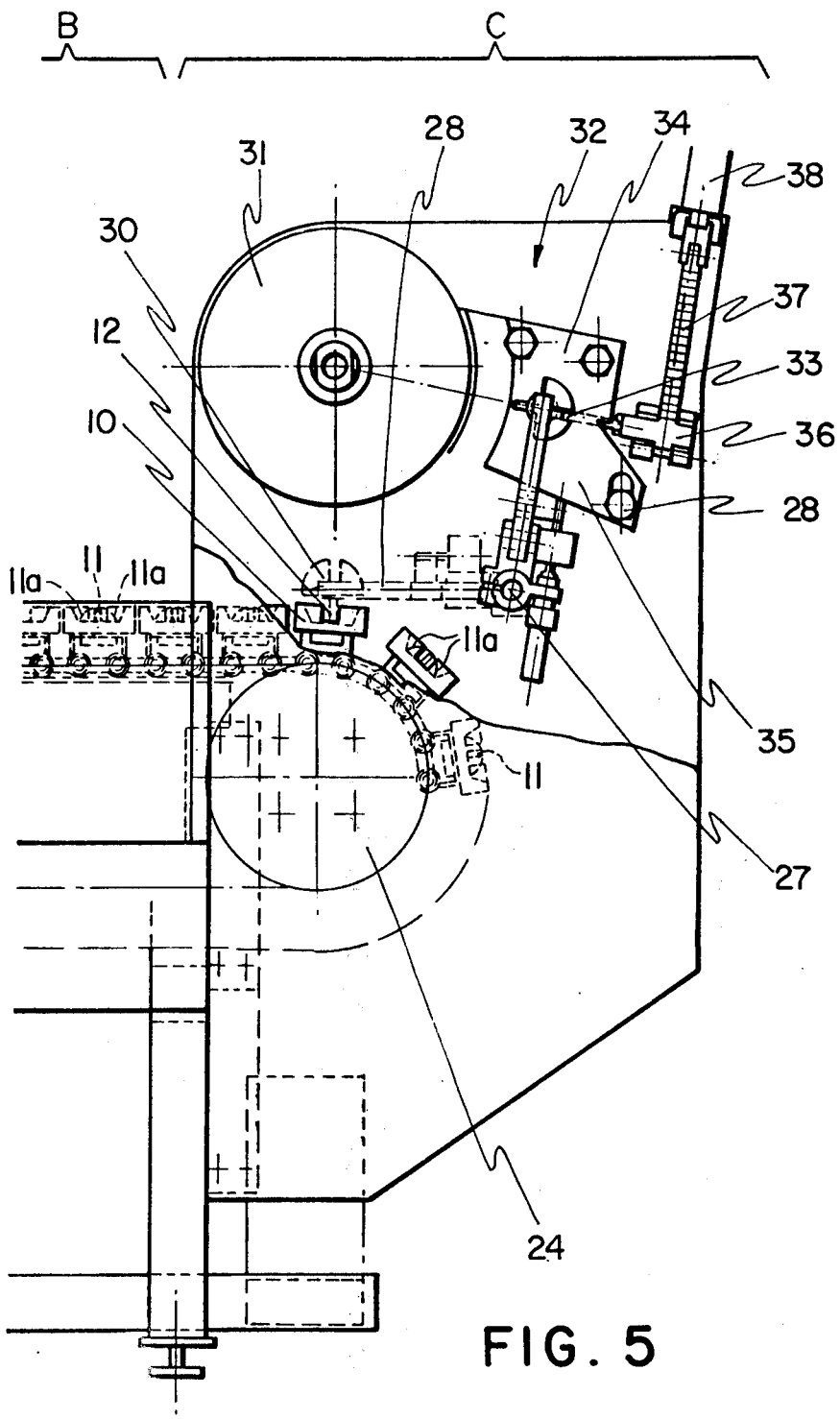
FIG. 5 is, on an enlarged scale, a side elevational view of the automatic cutting and pitting device which forms the third and final working zone of the machine of the invention.

Axle 27 is then rotated to move paired cups 30 and the fruit grasped thereby upwardly from the dashed line position to the solid line position of FIG. 5. Since the fruit is aligned with the major planar axis thereof coplanar with the plane of saw 31, due to wings 11a, the saw will cut completely through the fruit along the suture line thereof as the fruit is moved by the rotation of axle 27.

Figure 11:
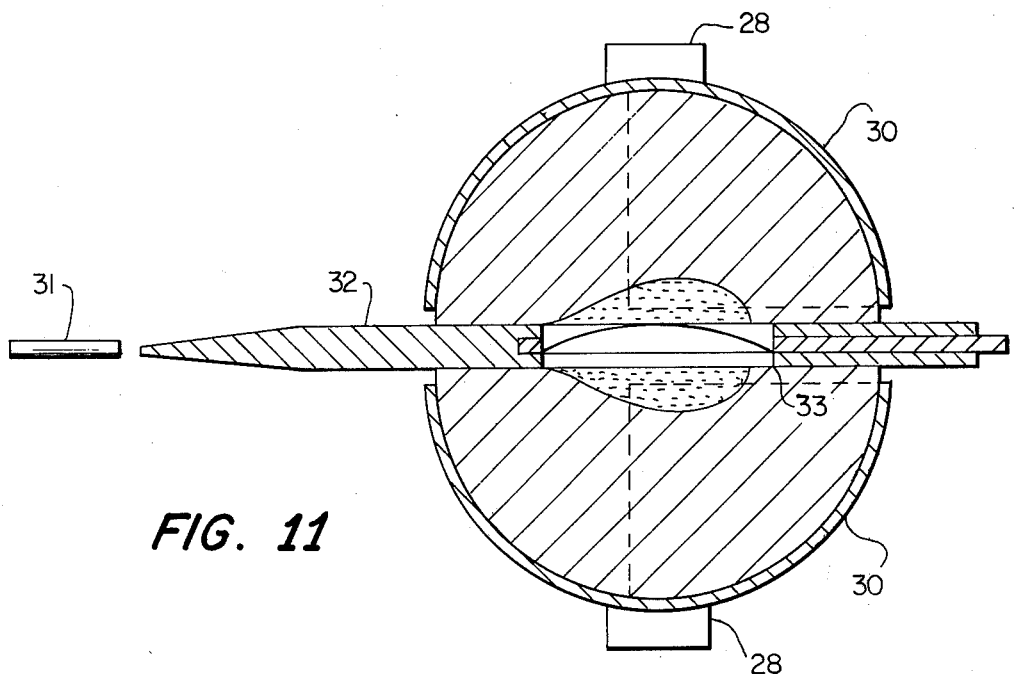
FIG. 11 is a cross-section taken along a plane transverse to the separator of FIG. 5 at a position intersecting the center of the fruit when in the position split by the separator and illustrating the position of the pitting knife before it has been rotated to achieve pitting.
Figure 12:
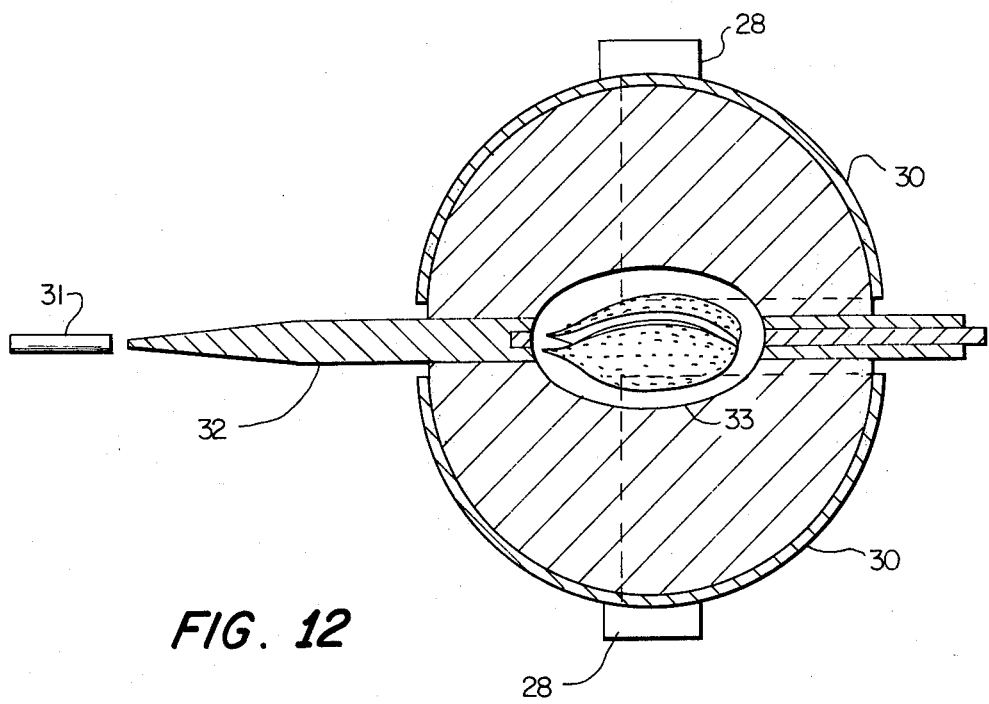
FIG. 12 is a view similar to FIG. 11, but showing the pitting knife during rotation to achieve pitting.

As the fruit is moved to the solid line position shown in FIG. 5 after having been cut through by knife 31, the fruit is gradually brought into contact with and penetrated along the cut by a stationary separator 32 which has a leading edge increasing in thickness over a length of, e.g. approximately 7 mm. Thus, the two halves of the fruit held by the cups 30 reach the end of their circular path at a position whereat an ovoidal knife 33, positioned within separator 32, is positioned concentrically within the fruit as shown in Fig. 11. By rotating ovoidal knife 33 by 360° in one direction as shown in FIG. 12, the pulp of the fruit is cut in an approximately concentric form and near to the pit.

The separator 32 is formed of two parts, i.e. a fixed part 34 and a dismountable part 35, which facilitates the operation of replacing the ovoidal knife 33.

Activation of the ovoidal knife 33 is achieved by means of a pinion 36 which is attached to an end of knife 33 and a rack 37 which is activated by means of a pneumatic piston 38, the force of which is generally lower than the resistance of the ovoidal knife 33.

Operation of each one of the parts of zones A, B and C of the machine is as follows.

In zone A, the fruit, conveniently graded, is supplied, e.g. by means of a lifting element or suitable conveying system, to hopper 1 which is vibrated by vibrator 4. Due to this vibration and to the inclination of hopper 1, the fruit is fed into and aligned by the channels 5.

This aligning action is complemented by circular brushes 5b.

Channels 5 supply the fruit to more steeply inclined channels 6 wherein the fruit remains aligned, and the first fruit of each row is abutted against ramp 7.

At the moment at which the conveyor places cups 10, which advance in groups of e.g. four, five, or six, at the upper edge of the ramp 7, the rods 8 or other synchronized actuators, activated by pneumatic pistons 9 or mechanically operated cams, pushes the first fruit of each row, which is supported on the ramp 7, upwardly along ramp 7, until the fruit is deposited into the respective cup 10. Immediately thereafter, the rods 8 or actuators recoil, causing the second piece of fruit in each row to abut against ramp 7 and become the first of the row. This piece of fruit is then arranged to be supplied during a new cycle which commences when the following group of cups 10 is brought to the top edge of the ramp 7.

By means of this system, the first working phase of the machine, consisting of the automatic feeding of a piece of fruit to each cup 10, is achieved.

The main function of second zone B is to subject the fruit cups 10 to a determined integral vibration. The cups 10, via vibrating table 14, transmit to the fruit an energy such that the fruit effects an irregular rotating movement within the cup. However, once the fruit is aligned such that wings 11a are in the cleft of the fruit, the force of the vibration is insufficient to move the fruit off of the wings. Thus, the wings brake further movement of the fruit after it is positioned with the suture line of the fruit oriented in the direction of the wings, i.e. the direction of advancement.

As will be understood from the above, the second zone B of the machine has the purpose of automatically positioning the fruit on its cleft with its suture line positioned in the direction of advancement. Also, second zone B is provided with a non-vibrated area allowing for visual or manual inspection of the fruit.

Zone C provides for cutting and pitting of the fruit at the end of the path of the endless conveyor of zone B.

The conveyor of zone B is intermittently advanced by means of a cam and star mechanism so that the conveyor is periodically stopped for a time necessary for the supply of the fruit to the cups 10 from zone A and for the transfer of the fruit to the cutting and pitting device in zone C.

When, due to the intermittent movement of the conveyor, a row of cups 10 reach a position vertically above the two driving pinions 24 and are stopped thereat during the final stop before the cups are turned around the pinions, the fruit gripping assemblies are in the lowered positions shown by dashed lines in FIG. 5, with the paired cups 30 spaced apart. Clips 25, arms 28 and cups 30 are then moved toward each other, and cups 30 grip the fruit, upon receipt of an impulse received from a computer contained in a control cabinet of the machine.

Under these conditions, axle 27 rotates and moves the gripping assembly and the gripped fruit in a circular ascending path to the position shown by the solid lines in FIG. 5.

The path of movement of the fruit is intervened by the circular toothed saw 31 which cuts, at the respective suture lines, all the fruit held by the cups 30.

In this way, the fruit, correctly cut, ascends to the zone of separator 32 which separates the fruit into the two halves thereof. The fruit held by the cups 30 is finally moved to the end of the circular path, whereat there is concentrically positioned within the fruit the ovoidal knife 33, which is then rotated by a 360° turn in one direction, thus cutting the pulp of the fruit concentrically and near to the pit.

At this precise moment the paired clips 25, arms 28 and cups 30 are moved away from each other, allowing the fruit halves to drop by gravity. The ovoidal knife 33 is rotated 360° in the opposite direction to expel the two halves of the pit which could otherwise have remained in the housing of knife 33.

The fruit and pit halves fall under gravity into a separating sieve. Thus, the fruit halves are separated from the pit halves.

Once the clips 25, arms 28 and cups 30 are opened, they return to their lower position, coinciding with the next intermittent stop of the endless belt which places a new row of fruit in a position to be collected by the gripping assembly.

Various modifications may be made to the above specifically described structural arrangement without departing from the scope of the invention.

I claim:

1. A machine for cutting and pitting fruit, particularly fruit such as peaches having therein a cleft extending in a direction of the line of suture of the fruit, said machine comprising:

a feeding device including an inclined hopper to which fruit is to be fed, means for vibrating said hopper to cause fruit therein to move along the inclination thereof, said hopper having a plurality of first channels to align the fruit in a plurality of rows, a plurality of second more inclined channels, one each aligned with one of said first channels, a plurality of upwardly inclined ramps, one each having a lower end aligned with one of said second channels and an upper end forming an outlet of said feeding device, fruit supplied along each said second channel abutting the respective said ramp, and means for intermittently moving said fruit abutting each said ramp upwardly therealong and over said outlet of said feeding device;

a fruit positioning device including an endless conveyor intermittently movable in synchronization with said fruit moving means in a direction substantially parallel to said channels, a plurality of receptacles mounted on said conveyor for receiving fruit from said outlet of said feeding device, said receptacles being arranged in columns extending transverse to said direction, each column having a plurality of receptacles equal to said plurality of channels, and means fixedly and permanently positioned within each said receptacle for aligning said fruit therein in a desired orientation; and a fruit cutting and pitting device including a plurality of gripping assemblies intermittently operable in synchronization with said endless conveyor, each said gripping assembly being positioned to grip a fruit aligned in one of said receptacles and remove said fruit therefrom, said gripping assembly being movable about a fixed stationary axis through a circular sector from a first position adjacent the discharge end of said conveyor to a second position spaced from said discharge end, a plurality of circular knives positioned between said first and second positions, one each for cutting in half a fruit gripped by a respective said gripping assembly, and a plurality of ovoidal pitting knifes, each said pitting knife being positioned at a stationary location to remove the pit halves from the fruit cut by a respective of said circular knives.

2. A machine as claimed in claim 1, further comprising means for vibrating said receptacles of said endless conveyor to thereby impart turning movement to a fruit in each said receptacle, and wherein said aligning means of said positioning device comprises a fixed pivot extending upwardly from the bottom of each said receptacle, each said pivot having extending in opposite radial directions therefrom a fixed wing dimensioned to fit within the longitudinal dimension of a peduncle cleft in the fruit, said wings preventing further turning of said fruit when positioned within the cleft thereof.

3. A machine as claimed in claim 2, wherein said conveyor comprises a plurality of laterally spaced endless chains, a plurality of beams extending transversely between said chains, said receptacles being mounted on said beams, a vibrated table having tracks, a plurality of pins extending from the ends of said beams and through first rollers of said chains, said first rollers riding on said tracks, second rollers mounted on said pins, and means for applying pressure on said second rollers in a direction to force said first rollers against said tracks, vibration from said table being transferred through said first rollers, said pins and said beams to said receptacles.

4. A machine as claimed in claim 1, further comprising a plurality of blade shaped separators, each said separator being a planar member extending in a plane parallel to the plane of the respective said circular knife and having a leading edge positioned between the respective said circular knife and the respective said second position, each said gripping assembly moving the fruit halves cut by the respective said circular blade over the respective said separator which separates the fruit halves, each said pitting knife being housed within the respective said separator at the respective said second position, and means connected to each said pitting knife for rotating said pitting knife about an axis thereof positioned within the plane of the respective said separator and for thereby causing said pitting knife to cut the pulp of the fruit halves adjacent the respective pit halves.

5. A machine as claimed in claim 4, wherein each said gripping assembly comprises a pair of arms circumferentially fixed about a rotatable axle, said arms having at the free ends thereof complementary cups dimensioned to grip therebetween a fruit, said arms being movable toward and away from each other.

6. A machine as claimed in claim 5, wherein each said receptacle has therethrough a groove extending in a direction orthogonal to the respective said wings, and each said complementary cup has depending therefrom a downwardly curved wedge dimensioned to fit within a respective said groove.

* * * * *